(12) United States Patent
Jang et al.

(10) Patent No.: US 7,679,594 B2
(45) Date of Patent: Mar. 16, 2010

(54) DRIVING CIRCUIT BUILT-IN LIQUID CRYSTAL DISPLAY PANEL

(75) Inventors: Yong Ho Jang, Gyeonggi-do (KR); Binn Kim, Seoul (KR); Soo Young Yoon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1204 days.

(21) Appl. No.: 11/139,622

(22) Filed: May 31, 2005

(65) Prior Publication Data

US 2005/0264507 A1  Dec. 1, 2005

(30) Foreign Application Priority Data

May 31, 2004  (KR)  ............... P2004-038887

(51) Int. Cl.
*G09G 3/36*  (2006.01)
(52) U.S. Cl. .................. 345/98; 349/151
(58) Field of Classification Search ............ 345/98, 345/100, 87; 349/151, 122, 138, 153
See application file for complete search history.

(56) References Cited

U.S. PATENT DOCUMENTS 6,323,924 B1 *  11/2001  Matsuoka et al. ........... 349/122

2004/0141139 A1 *  7/2004  Yamazaki et al. ........... 349/151

FOREIGN PATENT DOCUMENTS

| JP | 08-263028 | A |   | 10/1996 |
| JP | 11-194367 | A |   | 7/1999 |
| JP | 11194367 | A | * | 7/1999 |
| JP | 2000-155550 | A |   | 6/2000 |
| JP | 2004-118215 | A |   | 4/2004 |

* cited by examiner

*Primary Examiner*—Kevin M Nguyen
(74) *Attorney, Agent, or Firm*—Birch, Stewart, Kolasch & Birch, LLP

(57) ABSTRACT

A driving circuit built in liquid crystal display panel for increasing an area of a driving circuit by an overlap between the driving circuit and a sealant is disclosed. In the driving circuit built in the liquid crystal display panel, a liquid crystal cell matrix is provided in a display area of first and second substrates joined to each other by a sealant. A driving circuit is provided in a circuit area of a non-display area of the display panel at an outer portion of the display area to drive the liquid crystal cell matrix. A plurality of LOG-type signal lines are provided at a LOG area of the non-display area to supply a plurality of signals required for the driving circuit. The driving circuit area and the LOG area overlaps with the sealant.

12 Claims, 9 Drawing Sheets

DRIVING CIRCUIT BUILT-IN LIQUID CRYSTAL DISPLAY PANEL

This application claims the benefit of Korean Patent Application No. P2004-38887 filed in Korea on May 31, 2004, which is hereby incorporated by reference.

BACKGROUND OF THE INVENTION

1. Field of the Invention

This invention relates to a liquid crystal display, and more particularly to a liquid crystal display panel having a driving circuit built therein.

2. Description of the Related Art

A liquid crystal display (LCD), typically used as a display device of a television or a computer, controls light transmittance of a liquid crystal using an electric field to display a picture. Typically, the LCD includes a liquid crystal display panel having liquid crystal cells arranged in a matrix and a driving circuit for driving the liquid crystal display panel.

Referring to FIG. 1, a related art LCD includes a liquid crystal display panel 13 having (m×n) liquid crystal cells Clc arranged in a matrix, m data lines D1 to Dm and n gate lines G1 to Gn intersecting each other, thin film transistors (TFT) provided at the intersections of the data and gate lines, a data driving circuit 11 for applying data signals to the data lines D1 to Dm, and a gate driving circuit 12 for applying scanning pulses sequentially to the gate lines G1 to Gn.

The liquid crystal display panel 13 is formed by joining a (TFT) substrate provided with a TFT array to a color filter substrate provided with a color filter array with having a liquid crystal layer therebetween. The data lines D1 to Dm and the gate lines G1 to Gn cross each other perpendicularly. The TFT provided at each intersection of the data and gate lines transfers the data voltage signal supplied via the data line to a pixel electrode of the liquid crystal cell Clc in response to a scanning pulse from the gate line. The color filter substrate is provided with a black matrix, a color filter, a common electrode, etc.

The liquid crystal cell Clc rotates the liquid crystal having a dielectric anisotropy by a potential difference between the data voltage supplied to the pixel electrode and a common voltage supplied via the common electrode. The rotation of the liquid crystal is utilized to control light transmittance. A polarizer having a perpendicular light axis is attached onto the TFT substrate. The color filter substrate of the liquid crystal display panel 13, and an alignment film for determining a free-tilt angle of the liquid crystal is further provided on the inner side surface coming in contact with the liquid crystal layer. Further, each liquid crystal cell Clc is provided with a storage capacitor Cst. The storage capacitor Cst is situated between the pixel electrode and the pre-stage gate line or between the pixel electrode and a common line (not shown), thereby maintaining the data voltage applied to the liquid crystal cell Clc.

The data driving circuit 11 converts input digital video data into analog data voltage signals using a gamma voltage and applies the converted analog data voltage signals to the data lines D1 to Dm.

The gate driving circuit 12 sequentially applies scanning pulses so as to activate the gate lines G1 to Gn. A horizontal line of the liquid crystal cells Clc activated by the scanning pulse is supplied with the data signals via the data lines D1 to Dm.

More specifically, as shown in FIG. 2, the related art gate driving circuit 12 includes a shift register having first to nth stages 36 connected in a cascade to sequentially supply the scanning pulses to the gate lines G1 to Gn. All stages 36 shown in FIG. 2 are supplied with a common clock signal CLK, a high-level voltage signal VDD and a low-level voltage signal VSS. The first stage is supplied with a start pulse signal Vst and all remaining subsequent stages take as input the output of the previous stage. The first stage outputs the scanning pulse to the first gate line G1 in response to the start pulse Vst and the clock signal CLK. The second to nth stages sequentially outputs the scanning pulses to the second to nth gate lines G2 to Gn in response to the output signal of the previous stage and the clock signal CLK. The first to nth stages have the same circuit configuration. Clock signals having different phases are used for the clock signal CLK.

FIG. 3 illustrates a detailed circuit configuration of the first stage 36 of the shift register 12 shown in FIG. 2. The first stage 36 includes an output buffer 38 outputting the scanning pulse to the gate line G1 under the control of the controller 37 (see also FIG. 5). The output buffer 38 includes a pull-up NMOS transistor NT6 and a pull-down transistor NT7. When turned on, the pull-up transistor NT6 transfers the first clock signal CLK1 to the output line. When turned on, the pull-down NMOS transistor NT7 transfers the low-level voltage signal VSS to the output line. The transistor NT6 turns on when the Q node (part of the controller 37) is high and the transistor NT7 turns on when the QB node is high (also part of the controller 37). The controller 37 includes first to fifth NMOS transistors NT1 to NT5 for controlling the Q node and the QB node, which in turn control the output of the output buffer 38 as noted above. The first stage 36 is supplied with the high-level and low-level voltages VDD and VSS, the start pulse Vst, and with clock signals CLK1 to CLK4. The clock signals CLK1 to CLK4 have different phases from each other as shown in FIG. 4.

Hereinafter, the operation of the first stage 36 will be described with reference to the driving waveform shown in FIG. 4. During period A, the start pulse Vst and the fourth clock signal CLK4 are driven high. As a result, the first and second NMOS transistors NT1 and NT2 are turned on to pre-charge the Q node high. The high voltage of the Q node turns on the pull-up NMOS transistor NT6 which in turn allows the low voltage of the first clock signal CLK1 to be output to the first gate line G1. Also during period A, the fifth NMOS transistor NT5 is turned on by the high voltage of the start pulse Vst, which in turn pulls the QB node low. Both the NMOS transistor NT3B and the pull-down NMOS transistor NT7 are turned off due to the low voltage applied the QB node. Because the third clock signal CLK 3 is low during period A, the NMOS transistors NT3A and NT4 also are turned off. The transistor NT3A being turned off prevents the Q node from being pulled-down low and the transistor NT4 being turned off prevents the QB node from being pulled-up high.

During period B, the first clock signal CLK1 is driven high while both the start pulse Vst and the fourth clock signal CLK4 are driven low. The low states of the start pulse Vst and the fourth clock signal CLK4 cause the first and second NMOS transistors NT1 and NT2 to turn off. The pull-up NMOS transistor NT6 remains on due to the floating high voltage at the Q node. During period B, because of the high voltage of the first clock signal CLK1, the Q node is bootstrapped due to a parasitic capacitor CGD formed by an overlap between the gate electrode and the drain electrode of the pull-up NMOS transistor NT6. As a result, the Q node voltage is raised even higher which ensures that the pull-up NMOS transistor NT6 remains on. The high voltage of the first clock signal CLK1 is transferred to the output line of the output buffer 38 and appears as a scanning pulse to activate the first gate line G1.

During period C, the first clock signal CLK1 is driven low and the second clock signal CLK2 is driven high. The start pulse Vst and the fourth clock signal CLK 4 remain low. The first and second NMOS transistors NT1 and NT2 remain turned off due to the low voltages of the start pulse Vst and the fourth clock signal CLK4. The Q node remains in a floating high state to maintain the pull-up NMOS transistor NT6 in an on state. Thus, the low voltage of the first clock signal CLK1 is outputted to the first gate line G1 to deactivate the gate line G1.

During period D, the second clock signal CLK2 is driven low and the third clock signal CLK3 is driven high. The high state of the third clock signal CLK3 turns on the NMOS transistors NT3A to pull the Q node down low by the low voltage VSS. The transistor NT4 is also turned on due to the high voltage of the third clock signal CLK3. When the transistor NT4 is turned on, the QB node is pulled up high by the high voltage VDD. The high voltage at the QB node turns on the NMOS transistor NT3B to fully discharge the Q node. The pull-down NMOS transistor NT7 also turns on to output low voltage VSS to the first gate line G1.

During period E, the fourth clock signal CLK4 is driven high while the start pulse Vst remains low. Also the third clock signal CLK3 is driven low. The fourth transistor NT4 is turned off due to the third clock signal CLK3 being driven low and the fifth transistor NT5 remains turned off due to the low voltage of the start pulse Vst remaining low. As a result, the QB node is floated high. Thus, the pull-down NMOS transistor N7 remains on to maintain the low voltage VSS to the first gate line G1. The pull-down NMOS transistor NT7 remains on to supply the first gate line G1 with the low voltage VSS until the start pulse Vst is driven high.

If the related art gate driving circuit as mentioned above is built into a liquid crystal display panel 10 as shown in FIG. 5 by utilizing an amorphous silicon TFT, then the size of the output buffer 38 of each stage 36, that is, the pull-up and pull-down NMOS transistors NT6 and NT7 is significantly large. This because the scanning pulse is directly applied via the output buffer 38 as described above and the channel width of the output buffer 38 has a large affect on the life of the liquid crystal display panel 10. According to a design, the output buffer 38 must keep a channel width of more than several thousand μm. For this reason, an area occupied by the gate driving circuit 30 is substantial. However, certain product standards impose limits in how much the circuit area within the non-display area can be increased.

Referring to FIG. 5, the gate driving circuit 30 is provided in a non-display area of the display panel 10 and positioned at an outer portion of the display panel 10. A sealant 32 for joining the TFT substrate with the color filter substrate is coated, along a peripheral portion of the circuit area provided with the gate driving circuit 30, onto the non-display area. In FIG. 5, a makeup of a representative stage, such as the first stage 36 of FIG. 2, is illustrated. As illustrated, a line on glass (LOG) area 34, which is provided with a plurality of LOG-type signal lines for supplying a plurality of clock signals and power signals, is located on the left side of the stage 36, and the sealant 32 is provided on the left side of the LOG area 34. The stage 36 includes the output buffer 38 made up of the pull-up and pull-down transistors NT6 and NT7, and the controller 37 made up of the first to fifth transistors NT1 to NT5 for controlling the output buffer 38.

In the related art, if a glass fiber included in the sealant 32 comes in contact with a metal, then a damage can occur to cause an open such that the gate driving circuit 30 cannot be formed in a manner to overlap with the sealant 32. As shown in FIG. 6, a contact electrode 50 is formed to contact a gate metal layer 42. The contact electrode 50 also makes contact with the source/drain metal layer 42. The source/drain metal layer 46 is formed in a different layer than the gate metal layer 42 and a gate insulating film 44 is provided therebetween, all on a substrate 40. The exposed structure as shown in FIG. 6 for each stage 36 included in the gate driving circuit 30.

Referring to FIG. 6, the contact electrode 50 connects the gate metal layer 42 exposed via a first contact hole 52 passing through the protective film 48 and the gate insulating film 44 to the source/drain metal layer 46 exposed via a second contact hole 54 also passing through the protective film 48. For instance, in the detailed circuit of one stage shown in FIG. 3, the contact electrode 50 is utilized to connect the first to sixth nodes N1 to N6 to supply lines for high-level and low-level voltages VDD and VSS, supply lines for first to fourth clock signals CLK1 to CLK4 and a supply line for start pulse Vst, respectively, a connection node N7 between the gate electrode and the source electrode of the first transistor NT1, the Q node and the QB node, etc. If the contact electrode 50 comes in contact with the glass fiber 56 included in the sealant 32, then the contact electrode 50 may corrode to cause an electrical open.

Referring back to FIG. 5, the gate driving circuit 30 is not overlapped with the sealant 32. As a result, the circuit area is reduced. For example, in the case of 2.2" QVGA, a line width of the non-display area extended from the display area (pixel area) 20 until a scribing line of the thin film transistor substrate is about 2.2 mm. With such non-display area, the sealant 32 occupies a line width of 0.6 mm. Thus, a line width of the circuit area in which a usable gate driving circuit 30 can be formed must be within about 0.8 □0.9 mm in consideration of a margin required for the LOG area 34. Since the size of the output buffer 38, which is preferred to be large, is set within the circuit area and limited as described above, a scheme to increase the circuit area is sought.

SUMMARY OF THE INVENTION

Accordingly, it is an object of the present invention to provide a driving circuit built in a liquid crystal display panel that is adaptive for enlarging an area of the driving circuit by overlapping the driving circuit and the sealant.

In order to achieve these and other objects of the invention, a liquid crystal display panel having a driving circuit built in according to an embodiment of the present invention includes a liquid crystal cell matrix provided at a display area of first and second substrates joined to each other by a sealant; a driving circuit provided at a circuit area of a non-display area at an outer portion of said display area to drive the liquid crystal cell matrix; and a plurality of LOG-type signal lines provided at a LOG area of said non-display area to supply a plurality of signals required for the driving circuit, wherein the driving circuit area and the LOG area overlaps with the sealant.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Hereinafter, the preferred embodiments of the present invention will be described in detail with reference to FIGS. 7 to 9.

Figure 7:
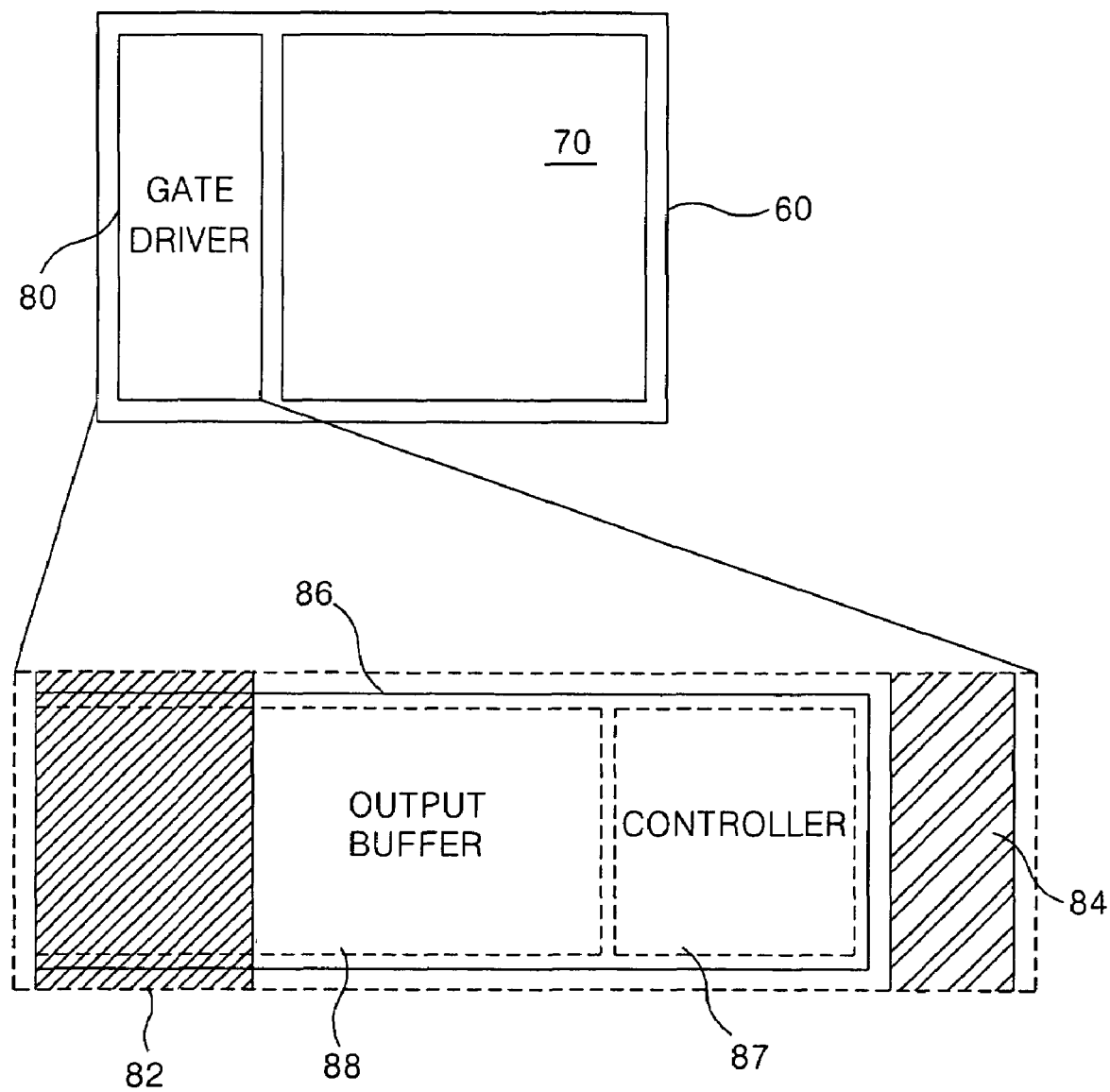
FIG. 7 illustrates a schematic plan view of a liquid crystal display panel having a gate driving circuit according to a first embodiment of the present invention.

FIG. 7 illustrates a schematic plan view of a liquid crystal display panel 60 having a gate driving circuit 80 built in according to an embodiment of the present invention. As shown, the liquid crystal display panel 60 includes a display area 70 at which liquid crystal cells provided for each pixel area defined by each intersection between gate lines and data lines are arranged in a matrix, and a gate driving circuit 80 built in a non-display area to drive the gate lines.

The liquid crystal display panel 60 is formed by joining a TFT substrate provided with a TFT array to a color filter substrate provided with a color filter array with having a liquid crystal layer therebetween.

The color filter substrate is provided with a color filter formed for each pixel area within the display area 70, a black matrix formed within the display area 70 in such a manner to divide color filters and also formed at the non-display area, and a common electrode for supplying a common voltage to the liquid crystal cell.

The display area of the TFT substrate is provided with gate lines and data lines intersecting each other, a TFT connected to each intersection and a pixel electrode of the liquid crystal cell connected to the TFT.

The circuit area of the non-display area of the TFT substrate is provided with the gate driving circuit 80 for driving the gate lines, and a LOG area 84 is provided with LOG-type signal lines for applying a clock signal and a power signal required for the gate driving circuit 80.

Figure 5:
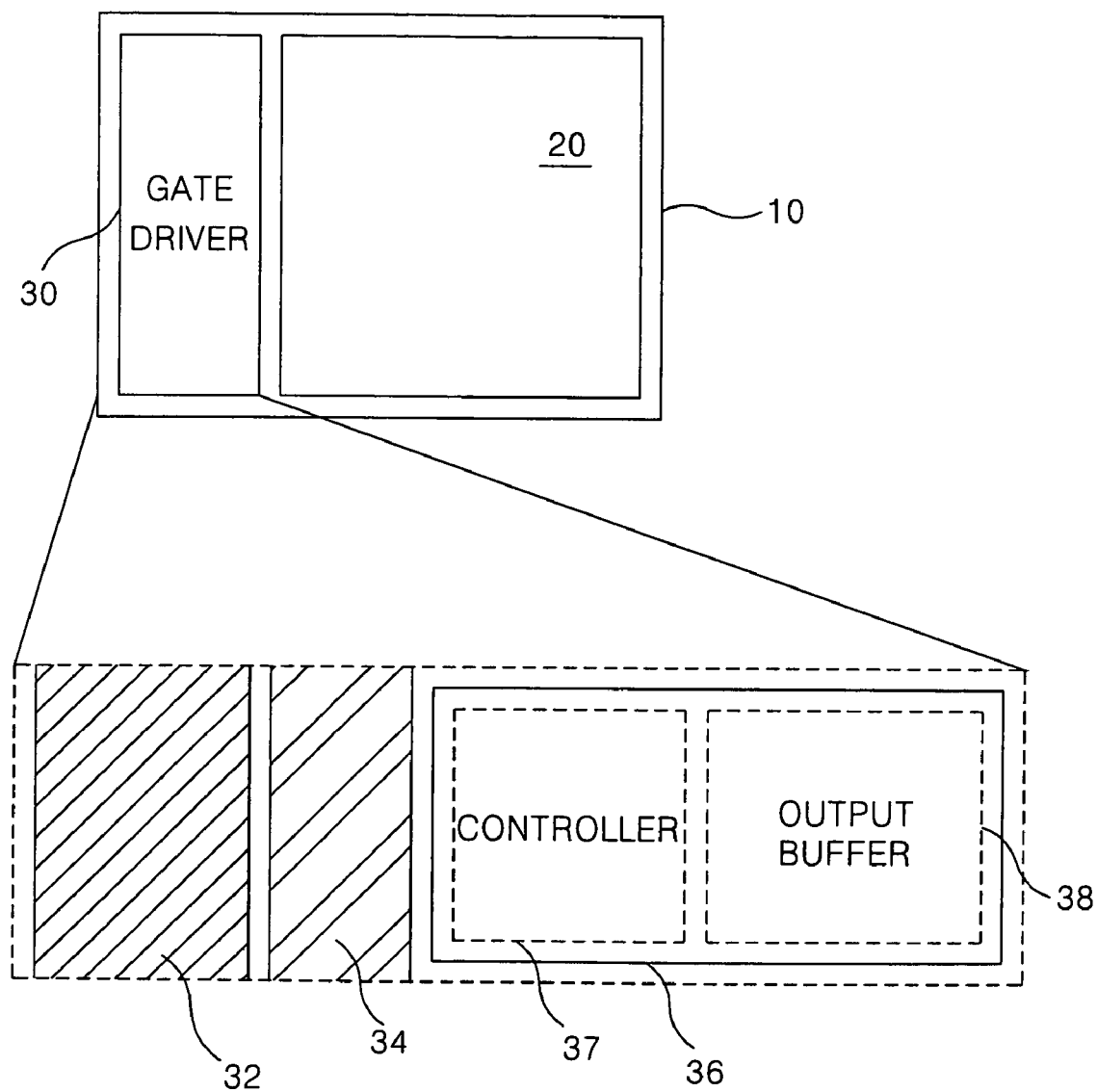
FIG. 5 is a schematic plan view of a related art liquid crystal display panel having a gate driving circuit built therein according to the related art.
Figure 6:
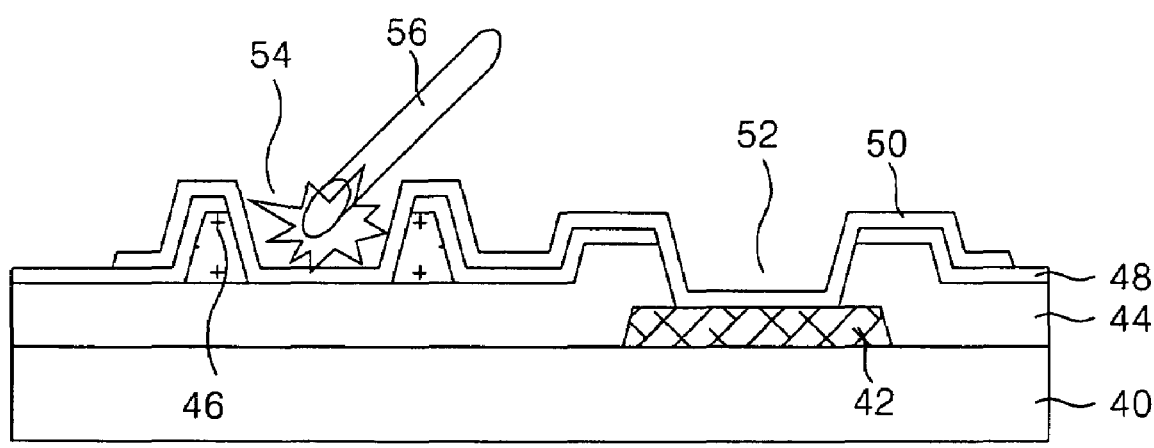
FIG. 6 is a section view of a contact portion included in the gate driving circuit of the related art of FIG. 5.

Herein, each stage 86 included in the gate driving circuit 80 is provided in such a manner to overlap with a sealant 82. In this instance, an output buffer 88 of each stage 86 overlaps with the sealant 82. This is because the pull-up and pull-down transistors NT6 and NT7 included in the output buffer 88 do not require the contact electrode 50. Thus, the corrosion caused by the glass fiber contained in the sealant 82 is not a factor even though the output buffer 88 overlaps with the sealant 82. The output buffer 88 is provided at a sealing area to be coated with the sealant 82, thereby significantly increasing the channel width of the output buffer 88 in comparison to the related art structure. For instance, the output buffer 38 of the related art (FIG. 5) occupies a line width of about 0.3 mm within a circuit area having a line width of about 0.9 mm, whereas the output buffer 88 can be formed more than three times larger when the sealant 82 having a line width of 0.6 mm overlaps with the output buffer 88 as illustrated in FIG. 7.

Figure 8:
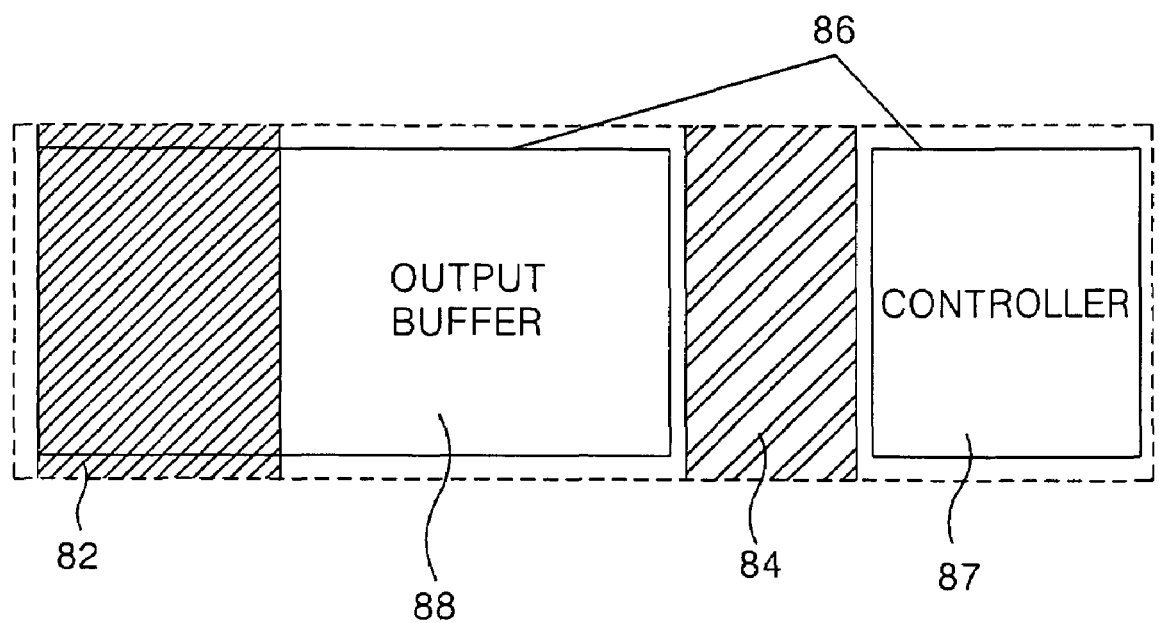
FIG. 8 is a plan view illustrating a non-display area of a liquid crystal display panel according to a second embodiment of the present invention.

When the output buffer 88 of each stage 86 overlaps with the sealant 82 in this manner, the LOG area 84 occupied by the LOG-type signal lines can be located between each stage 86 and the display area 70. Alternatively, in a second embodiment of the present invention, the LOG area 84 may be positioned between the output buffer 88 and the controller 87 of each stage 86 as shown in FIG. 8. In this embodiment, a portion of the output buffer 88 overlaps with the sealant 82.

Figure 1:
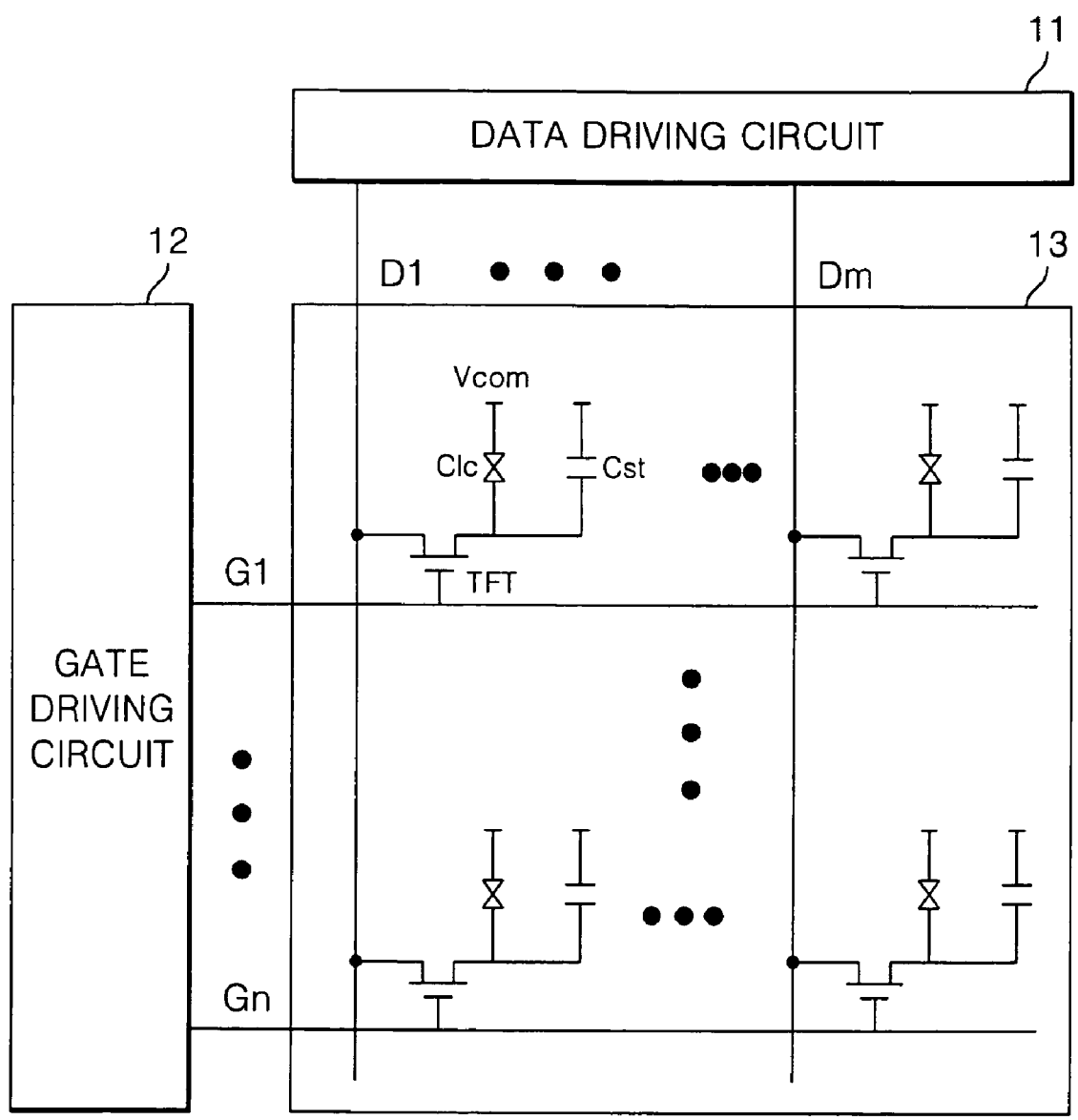
FIG. 1 is a block circuit diagram showing a configuration of a related art liquid crystal display device.
Figure 2:
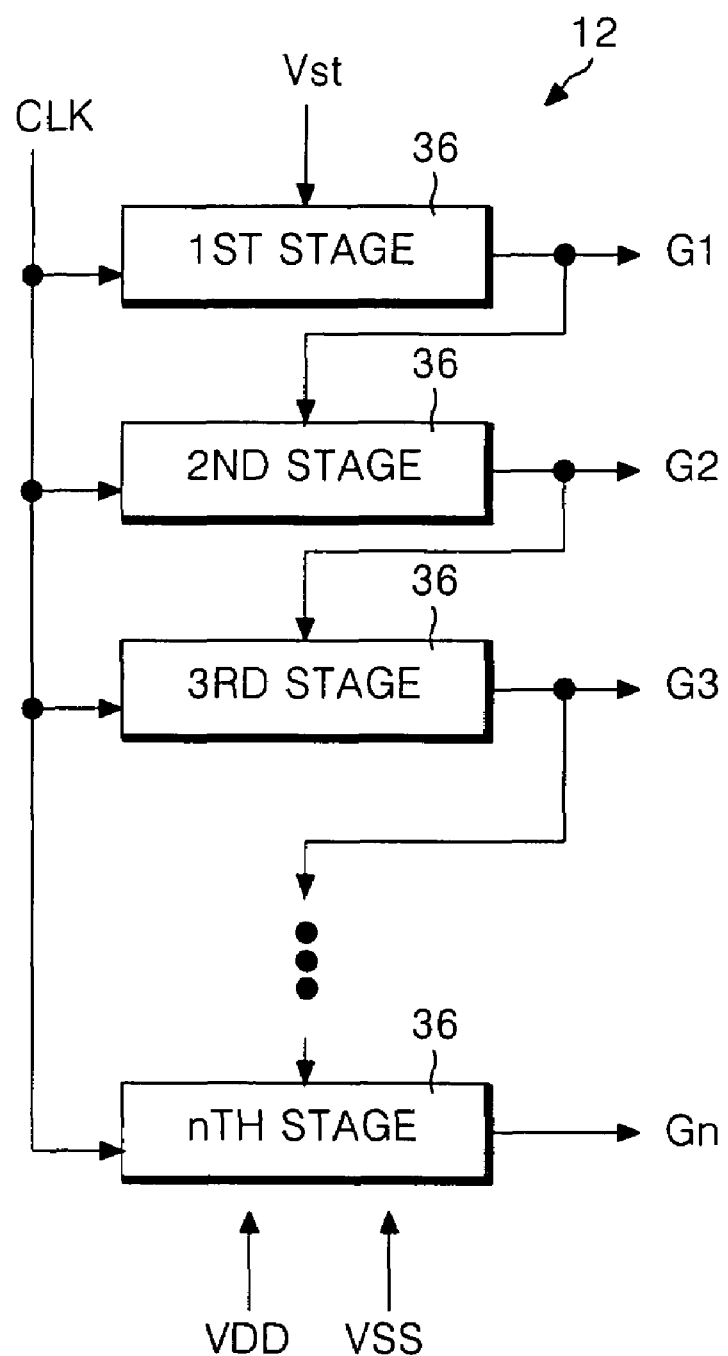
FIG. 2 is a block diagram showing a configuration of the gate driving circuit of the related art of FIG. 1.
Figure 3:
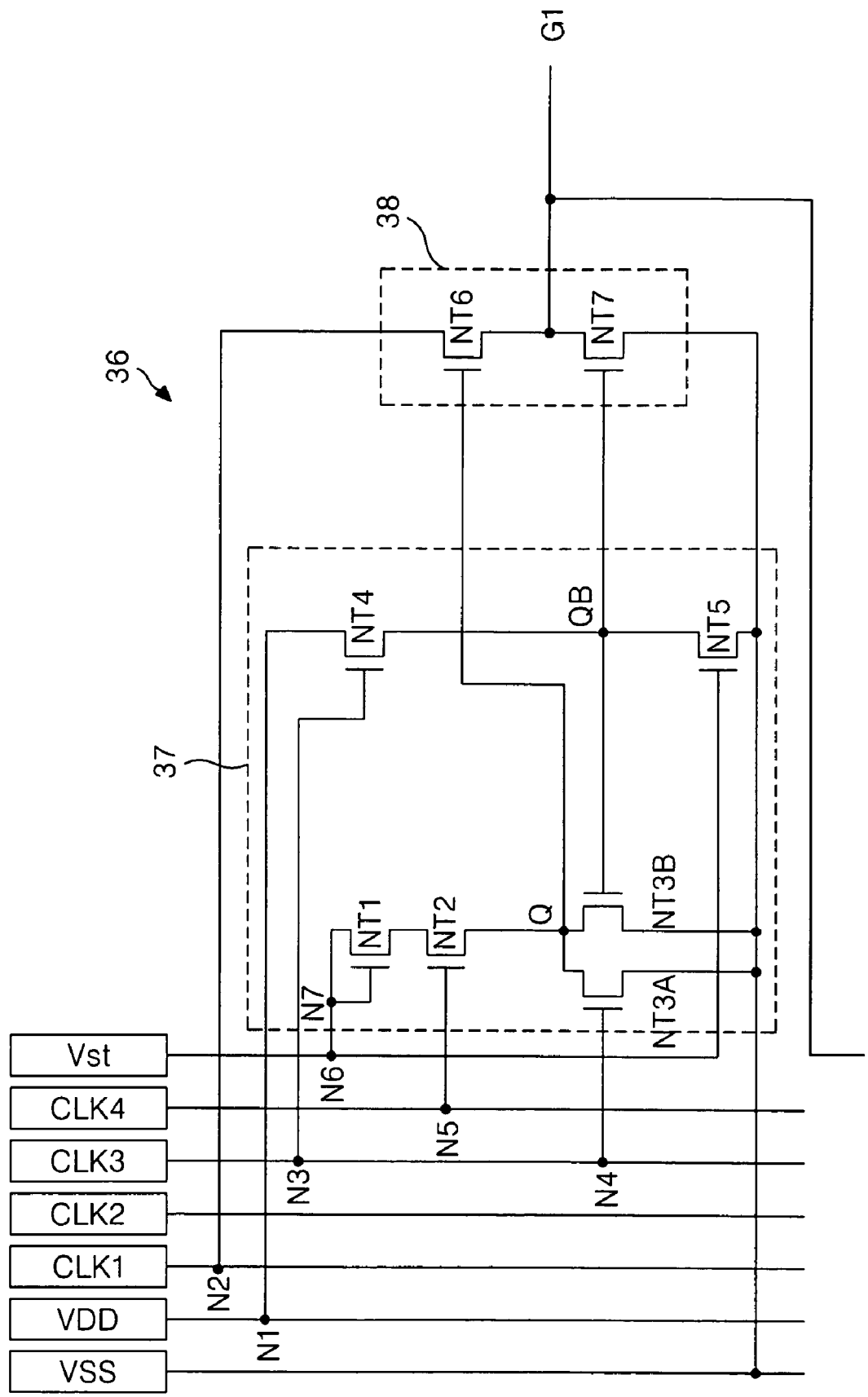
FIG. 3 is a detailed circuit diagram of the 1st stage of the related art of FIG. 2.
Figure 4:
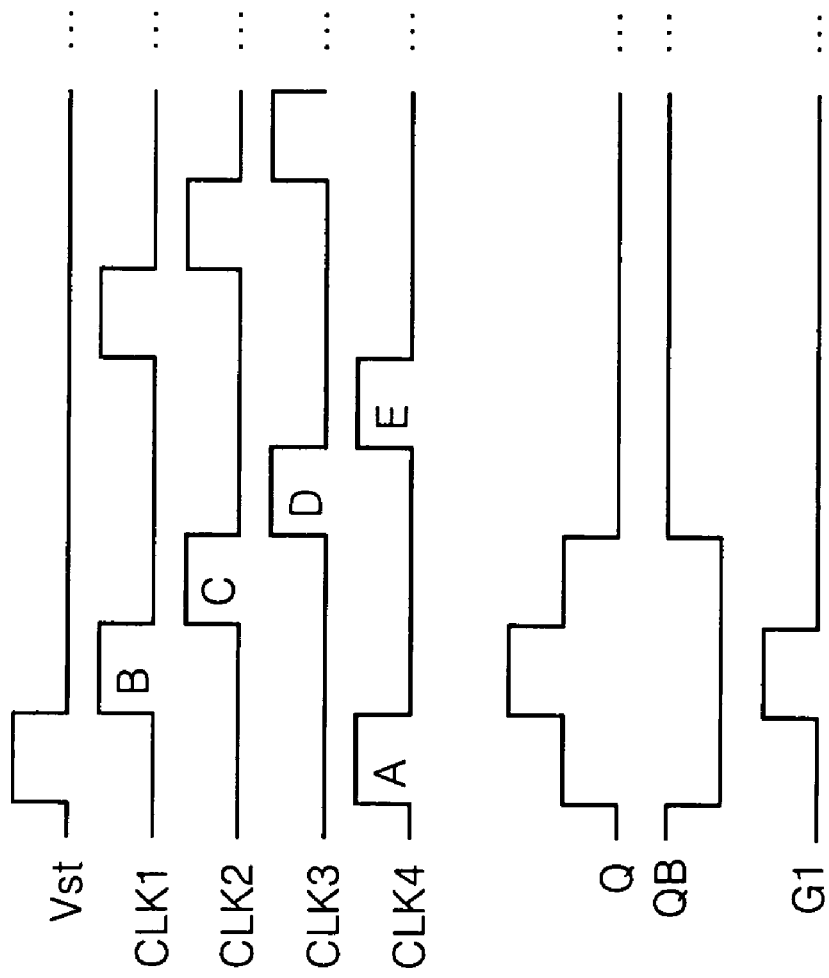
FIG. 4 is a driving waveform diagram of the 1st stage of the related art of FIG. 3.
Figure 9:
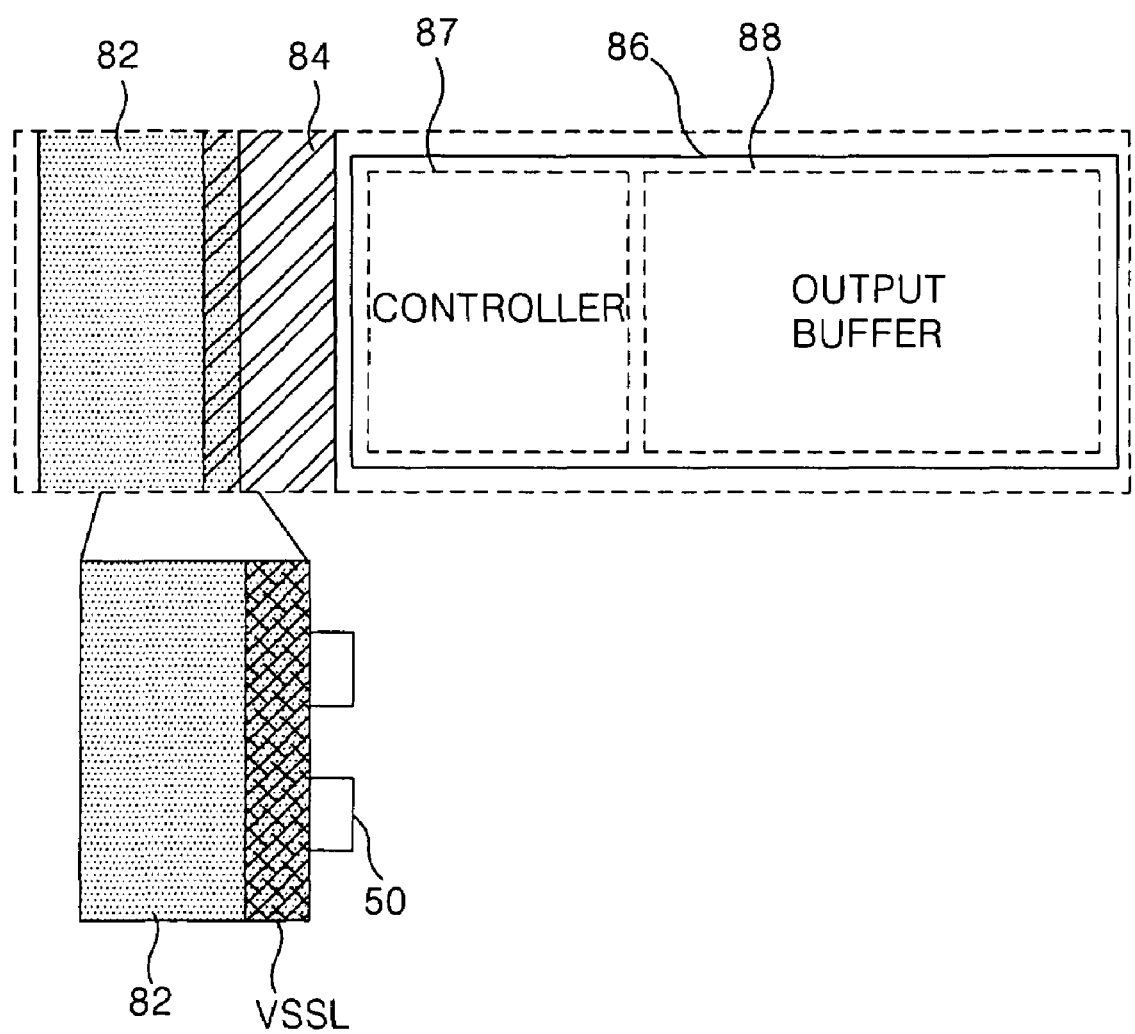
FIG. 9 is a plan view illustrating a non-display area in a liquid crystal display panel according to a third embodiment of the present invention.

In a third embodiment of the present invention, the LOG area 84 is formed in such a manner to overlap with the sealant 82 as shown in FIG. 9. The circuit area of each stage 86 can be increased by the area occupied by the LOG area 84, and the size of the output buffer 88 can be increased accordingly. In this embodiment, the LOG area 84 includes a plurality of contact electrodes 50 because the LOG-type signal lines include a plurality of nodes N1 to N6 as shown in FIG. 3. To prevent overlap between the contact electrode 50 and the sealant 82, a supply line VSSL, as shown in the enlarged portion of FIG. 9, to supply the low-level voltage VSS is preferred to be thick to provide circuit stability to handle a large amount of current flow. The VSSL line may overlap with the sealant, but is preferred to extend beyond the area for the sealant 82. The low-level voltage supply line VSSL is connected to the contact electrodes 50 away from the sealant to ensure that the contact electrodes 50 do not overlap the sealant 82.

As described above, the driving circuit built in the liquid crystal display panel according to the embodiments of the present invention provides the driving circuit in a manner to overlap with the sealant, thereby significantly increasing the circuit area. Accordingly, the driving circuit built in the liquid crystal display panel according to the embodiments of the present invention can allow the channel width of the output buffer to be enlarged to reliably deliver the scanning pulses and enhancing the life of the liquid crystal display panel. In other words, the distortion of the scanning pulse waveform is reduced and the life of the display panel is prolonged.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display panel, comprising:
   a plurality of liquid crystal cells defined by crossing a plurality of gate lines and data lines and provided at a display area of first and second substrates joined to each other by a sealant;
   a gate driving circuit having a plurality of stages and provided at a circuit area of a non-display area at an outer portion of the display area, each stage including an output buffer connected to a corresponding gate line for applying a scanning pulse to the corresponding gate line and a controller connected to the output buffer for controlling an output of the output buffer; and
   a plurality of LOG-type (line-on-glass) signal lines and a plurality of contact electrodes that connect the signal lines and the stages for applying a plurality of signals to the stages and provided at a LOG area of the non-display area, wherein the signal lines or a portion of the output buffer overlaps with the sealant.

2. The liquid crystal display panel according to claim 1, wherein the signal lines and the contact electrodes have different metal layers.

3. The liquid crystal display panel according to claim 1, wherein the signal lines and the contact electrodes are positioned between the controller of each stage and the display area.

4. The liquid crystal display panel according to claim 1, wherein the signal lines and the contact electrodes are positioned between the output buffer of each stage and the controller.

5. The liquid crystal display panel according to claim 1, wherein a low-level voltage supply line overlaps with the sealant, and the signal lines are connected to the contact electrodes away from the sealant.

6. The liquid crystal display panel according to claim 5, wherein a line width of each signal line is wide enough to extend beyond an area occupied by the sealant.

7. A liquid crystal display panel, comprising:

a display area including gate lines;

a non-display area including a circuit area and a line-on-glass signal (LOG) area, wherein the circuit area includes a gate driving circuit having a plurality of stages, and the LOG area includes a plurality of line-on-glass signal (LOG) lines and a plurality of contact electrodes that connect the signal lines and the stages for applying a plurality of signals, and wherein the stages includes an output buffer connected to a corresponding gate line for applying a scanning pulse to the corresponding gate line and a controller connected to the output buffer for controlling an output of the output buffer; and a sealant for joining substrates of the liquid crystal display panel, wherein the signal lines or a portion of the output buffer overlaps with the sealant.

8. The liquid crystal display panel of claim 7, wherein the controller is placed opposite to the side on which the portion of output buffer overlaps with the sealant.

9. The liquid crystal display panel of claim 8, wherein the controller is adjacent to the output buffer on one side and the controller is adjacent to the LOG area.

10. The liquid crystal display panel of claim 8, wherein the signal lines and the contact electrodes are is between the output buffer and the controller.

11. The liquid crystal display panel of claim 7, wherein the signal lines are provided at an edge of the sealant and extending beyond the sealant.

12. The liquid crystal display panel of claim 7, wherein the each stage is provided adjacent to the LOG area one side of the LOG area and the sealant is provided on another side of the LOG area.

* * * * *